March 27, 1934. T. PEAK 1,952,278
BEVERAGE COOLING AND DISPENSING SYSTEM
Filed June 30, 1933
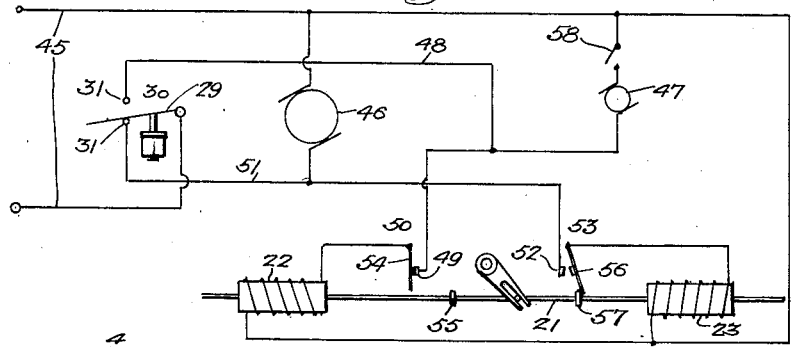
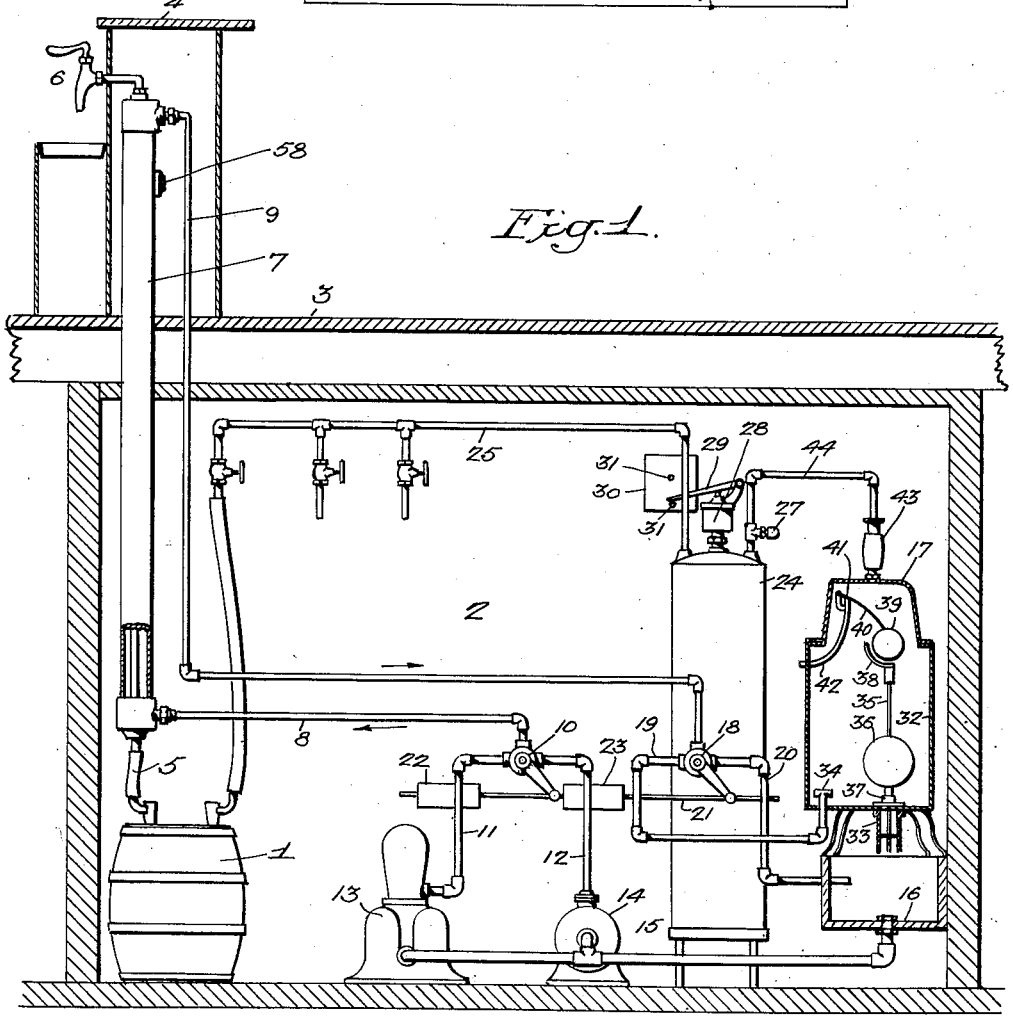
Inventor:
Thomas Peak
by his Attorneys
Howson & Howson Patented Mar. 27, 1934

1,952,278

UNITED STATES PATENT OFFICE 1,952,278

BEVERAGE COOLING AND DISPENSING SYSTEM

Thomas Peak, Philadelphia, Pa.

Application June 30, 1933, Serial No. 678,513

9 Claims. (Cl. 225—15)

This invention relates to beverage cooling and dispensing systems and, more particularly, to systems for dispensing effervescent or "live" beverages, such as beer. By "live" beverages I mean those having more or less self pressure and which are not flat as are ales for example. Since the invention is especially adapted and designed for dispensing of beer or like beverage, it will be discussed with reference thereto, but it is to be understood that it is in no way limited to the dispensing of any particular beverage.

The principal object of the invention is to provide an efficient system for conveying cooled beverage from a source of supply to a dispensing point.

A more specific object of the invention is to provide an efficient system for supplying the proper air pressure to a beverage of the type above mentioned and for maintaining the beverage at the desired low temperature right up to the dispensing point.

A further object of the invention is to provide a system of this nature comprising a closed cooling system for circulating cooling fluid, and means operable by the circulating fluid for supplying compressed air to an air storage tank.

A still further object of the invention is to provide a system having a fluid-circulating system, a plurality of fluid-circulating devices which may be selectively included in said system, and means operable by the circulating fluid for supplying compressed air to an air storage tank.

The above and other objects of the invention will be more clearly understood from the following detailed description and the accompanying drawing.

In the drawing:

Fig. 1 is an elevational view of my improved cooling and dispensing system; and

Fig. 2 is a schematic wiring diagram of the electrical circuits and equipment utilized in the system.

In the dispensing of effervescent beverages, such as beer, it is absolutely essential that the beverage be maintained at the proper drinking temperature right up to the dispensing faucet. After the beverage is cooled, if it is allowed to rise to any extent in temperature on its way to the faucet, its quality is detrimentally affected, it becomes flat, and it loses its desired taste. Furthermore, any rise in temperature of such a beverage causes a corresponding rise in pressure with accompanying difficulty of handling. In other words, the rise in pressure causes the beer to "run wild" and makes it impossible to draw it from a faucet. It is also essential that the proper external pressure be supplied to beer or like beverages, especially where the beer is being raised from a source of supply in a basement or the like to a higher dispensing point such as a bar located on an upper floor, as is quite commonly the case. If the pressure is not maintained at the proper value in any particular instance, it will be difficult or even impossible to dispense the beverage. If the pressure is too low, difficulty will be encountered in raising the beverage to the dispensing point, while if the pressure is too high, the beverage will "run wild" as above noted. There is, therefore, a need for some means for maintaining the proper temperature right up to the faucet. Otherwise the beverage lying in the supply pipe becomes warm and the above noted difficulties are encountered.

Referring now the drawing and particularly to Fig. 1 for an illustration of the invention as applied to the dispensing of beer, there is shown a beverage supply source 1, which source in the present instance is illustrated as a keg. The keg is located within a suitable chamber 2 which, in the embodiment under consideration, takes the form of a cooling or refrigerating chamber. Chamber 2 may be located in the cellar or basement immediately below the floor 3, upon which the bar 4 is located. It will be apparent, of course, that any suitable means may be utilized for maintaining chamber 2 at the desired temperature. Preferably, however, a suitable automatically controlled mechanical refrigerating system should be used for this purpose.

A beverage supply pipe 5 leads from the source of supply 1 to the dispensing faucet 6 at the bar. In order to maintain the beer at the proper drinking temperature right up to the faucet, the supply pipe is run longitudinally through an elongated cylindrical cooling jacket 7. The cooling jacket is supplied with a cooling fluid, such as water, by a supply pipe 8 leading to the bottom of the jacket. The cooling fluid passes through the jacket about the beverage supply pipe 5, as will be clear from the sectional showing of the jacket at the lower portion thereof. The cooling fluid leaves the cooling jacket via the return pipe 9 which is brought down into the cooling chamber 2. Although in the system as illustrated, the cooling fluid is returned directly from the cooling jacket 7, it will be apparent that the cooling fluid might be passed through two or more cooling jackets before being returned to the cooling chamber provided the system were properly designed.

Pipe 8 is connected through the two-way valve 10 to branch pipe lines 11 and 12. Pipe line 11 leads to a relatively large pump 13, while pipe line 12 leads to a small pump 14. While these pumps may be driven in any suitable manner, they are preferably driven by electric motors, as will be more clearly set forth hereinafter. The inlets of the two pumps are connected to pipe line 15 which is connected to the discharge reservoir 16 of a fluid-operated air compressor 17. This air compressor will be described in detail hereinafter.

Pipe line 9 is connected through two-way valve 18 to branch pipe lines 19 and 20. The branch line 19 is connected to the compression chamber of compressor 17, while branch line 20 leads to the discharge reservoir 16 of the compressor.

When valves 10 and 18 are in the positions illustrated, the branch lines 11 and 19 are open, while the branch lines 12 and 20 are closed, so that the flow of cooling fluid through the cooling system is through the air compressor 17 and the large pump 13. Pump 13 receives the fluid from the discharge reservoir 16 and forces the fluid under pressure through the cooling system in the direction of the arrows. At this time, compressor 17 is operated by the circulating fluid in a manner which will be described hereinafter.

When valves 10 and 18 are thrown in the opposite position, however, the branch lines 11 and 19 will be closed and branch lines 12 and 20 will be opened. This will serve to take the large pump and the compressor 17 out of service and will put the small pump 14 into service. In such instance, the cooling fluid will be circulated in the direction of the arrows by the small pump 14, the fluid returning through branch line 20 to reservoir 16. The reason for having the large and small pumps arranged as illustrated is that when the air compressor 17 is in service, the cooling fluid, which serves also to operate the compressor, must be forced through the system at a relatively high pressure. When, however, the air compressor is not needed and is removed from service, the smaller pump 14 suffices to circulate the cooling fluid at the lower pressure required. The operating levers of valves 10 and 18 are connected to a reciprocable rod 21 which may be actuated by solenoid devices 22 and 23. This operation will be more fully explained hereinafter.

The purpose of the air compressor 17 is to supply compressed air to an air storage tank 24 which, in turn, supplies compressed air to the beverage source 1 via pipe line 25. It will be obvious that branch lines may be taken off the main air supply line to different beverage sources as clearly illustrated. A relief or safety valve is preferably provided as at 27. The operation of solenoids 22 and 23 is controlled by a pressure-responsive device 28 attached to the air storage tank 24. This device may be of conventional form and may simply comprise a diaphragm acted upon by the air pressure and, in turn, actuating a movable switch arm 29. This switch arm forms a part of switch 30 which also comprises stationary contacts 31 that are engageable by arm 29.

The fluid-operated air compressor 17 is preferably of the type known in the art as the "I. X. L. compressor". This device may be termed a "static" device or, in other words, one which has no continuously moving parts and which is operated by the building up of a body of liquid, as distinguished from compressors of the dynamic type, such as those employing a rotating motor and a reciprocating plunger for compressing the air. In the appended claims, I have used the word "static" to designate the particular device which is herein contemplated, it being understood that, although the particular device above mentioned is preferred, any other device which operates in substantially the same or a similar manner may be used.

Since the particular air compressor is well known in the art, it is unnecessary to describe it in detail. A general description will, however, be given. This device comprises a tank or container 32 having an outlet passage 33 leading to the discharge reservoir 16 above mentioned. The inlet passage to the tank is shown at 34. A vertical rod 35 carries a sliding float ball 36 and, at its lower end, the rod carries a valve 37 which is adapted to close the outlet passage of the tank. The upper end 38 of the rod is shaped to engage and lift ball 39 which is carried at the end of the actuating rod 40 of an air valve 41. Valve 41 controls an air passage 42 leading into the upper part of tank 32. A check valve 43 is provided in the air supply pipe 44 connecting the air compressor and tank 24.

Considering the operation of the air compressor, initially the tank 32 will be filled with air and valves 37 and 41 will be closed. Water flowing into the tank 32 through the inlet passage 34 is collected therein and gradually rises. As the water rises it compresses the air and forces it through pipe 44 and check valve 43 to tank 24. The float ball 36 rises with the water and after a predetermined amount of water has collected in the tank, ball 36 will engage portion 38 of rod 35, thereby moving the rod upward to lift valve 37 from its seat. At the same time, portion 38 of the rod engages and lifts ball 39, thereby opening the air valve 41. The water rushes into the discharge tank 16 and, at the same time, air is admitted to tank 32 to take the place of the water. As the water level recedes, ball 36 recedes with it, but valve 37 is kept open by the water passing therethrough. When all of the water has been discharged into tank 16, valve 37 closes, as does also air valve 41. The parts are then in their original position, as shown, and the device is ready for repeated operation. It will be seen that the device forces successive quantities of air through pipe 44 to tank 24 at predetermined intervals of time.

This type of air compressor has been commonly used in the past, particularly in beer-dispensing systems. It has numerous advantages over any other type of compressor which render its use desirable in any instance and particularly in the dispensing of beer. One advantage of the device is that it has very few moving parts and no continuously moving parts subject to frictional heat and wear. Therefore, it is not apt to get out of order or require repair over a long period of time. Another advantage of the device is that it requires practically no attention during operation. The maintenance and operating expense of the device is, therefore, very low. Another advantage of the device is that its efficiency is very high, there being very little energy loss in it. A further advantage of the device which renders it particularly desirable in a beer-dispensing system is that there is no possibility of oil or other foreign substance getting into the beer. In many types of compressors, for example, the ordinary reciprocating plunger compressor, there is a tendency for lubricating oil to be pumped along with the air. Obviously, this is a serious objection in any case where the air is being supplied to a beverage such as beer. This objection is obviated in the type of compressor herein contemplated. In fact, the device needs no lubrication by oil.

In using this compressor in the past, it has been common practice to connect it to a water supply line leading from city mains and to run a continuous stream of water through the device, exhausting the water to the sewer. This, however, has been objectionable due to the fact that in many instances, particularly where the water rates are high, the water consumption has been quite expensive. Also the variation in pressure of the water has given considerable trouble, the water pressure being insufficient at times to properly operate the compressor.

The present invention eliminates entirely the objections to the prior use of the air compressor by using the circulating cooling fluid to operate it. This, broadly, is the contemplation of the invention. It is preferred, however, to utilize two circulating pumps, as disclosed herein, to effect economy during periods when the compressor is not in use. By using two pumps which operate alternately, as contemplated herein, there is effected not only a saving in energy which is required during the various periods of operation of the entire system, but there is also effected a saving in the maintenance and repair of the circulating pumps. Obviously, the alternate use of two pumps adds to the life of the pumps, as compared to the continuous use of a single pump. It will be noted that, in effect, there are two liquid-circulating systems which have a common portion that passes through the cooling jacket 7.

Referring now to Fig. 2 for a clearer understanding of the control of the system, electrical supply lines 45 supply electrical energy to motors 46 and 47 which are adapted respectively to drive the water-circulating pumps 13 and 14, the large motor 46 driving the large pump 13 and the small motor 47 driving the small pump 14. The movable switch arm 29 of switch 30 is connected to one side of the line, as clearly illustrated. The upper contact 31 of the switch is connected via conductor 48 to one terminal of motor 47 and also to the stationary contact 49 of switch 50. The lower contact 31 of switch 30 is connected via conductor 51 to one terminal of motor 46 and also to stationary contact 52 of switch 53. The other terminals of motors 46 and 47 are connected directly to the supply line. The movable contact blade 54 of switch 50 is urged to its closed position by its own spring tension and is engageable by collar 55 carried on rod 21. Likewise, the movable contact blade 56 of switch 53 is urged to its closed position and is engageable by collar 57, as illustrated. The energizing winding of solenoid 22 is serially connected with switch 50 and is shunted through the switch about motor 47. The energizing winding of solenoid 23 is serially connected with switch 53 and is shunted through the switch about motor 46.

Considering the operation of the control mechanism, let us suppose that the large circulating pump is in operation and, therefore, motor 46 is running, switch 30 being in the position shown, switch 53 is open as illustrated. Now when the pressure in tank 24 increases to such a value as to actuate the pressure-responsive device 28, switch 30 will be actuated to open the circuit of motor 46 and to close the circuit of motor 47. Switch 30 also energizes solenoid 22 through the shunt circuit including the closed switch 50. Solenoid 22 upon its energization, draws rod 21 toward the left, thereby allowing switch 53 to close and opening switch 50. The closure of switch 53 is ineffective, as will be obvious, but the opening of switch 50 de-energizes solenoid 22. The valve mechanisms 10 and 18 are operated by rod 21 to open the circulating branches 12 and 20 so as to condition the system for circulation by the small pump.

When the pressure in tank 24 drops below a predetermined value, switch 30 will again be actuated to open the circuit of motor 47 and close the circuit of motor 46. At the same time, solenoid 22 will be energized through the closed switch 53 to move rod 21 toward the right and thus actuate valves 10 and 18 as desired.

It is possible that during operation of the small circulating pump, when cooling of the beverage in the beverage supply line is the only function, there may be times when the beverage is sufficiently cool to require no circulation of the cooling liquid. In order to effect a saving in the operation of the system, there may be provided a thermostatic switch 58 which is serially connected with motor 47 as illustrated and which is arranged to respond to the temperature of the beverage in the beverage supply pipe so as to open the circuit of motor 47 when the temperature of the beverage reaches a predetermined low value. This feature is an optional one.

Although the invention has been described with reference to a specific preferred embodiment, it will be apparent that various changes and modifications may be made without departing from the spirit and scope of the invention.

I claim:

1. In a system of the class described, a source of beverage supply, means for conveying beverage from said source to a dispensing point, a closed cooling system through which cooling fluid may circulate to cool the beverage on its way to said dispensing point, means for circulating cooling fluid through said cooling system, and means for supplying compressed air to said source, comprising an air compressor operable by the circulating fluid.

2. In a system of the class described, a source of beverage supply, means for conveying beverage from said source to a dispensing point, a compressed air storage tank, means for conveying compressed air from said tank to said source, a closed cooling system through which cooling fluid may circulate to cool the beverage on its way to said dispensing point, means for circulating cooling fluid through said cooling system, and means operable by the circulating fluid for supplying compressed air to said tank.

3. In a system of the class described, a source of beverage supply, means for conveying beverage from said source to a dispensing point, a compressed air storage tank, means for conveying compressed air from said tank to said source, a closed cooling system through which cooling fluid may circulate to cool the beverage on its way to said dispensing point, means for circulating cooling fluid through said cooling system, and means comprising a static air compressor operable by the circulating fluid for supplying compressed air to said tank.

4. In a system of the class described, a cooling chamber, a source of beverage supply in said chamber, a dispensing bar external to said chamber, means for conveying beverage from said source to said bar, a compressed air storage tank in said chamber, means for conveying compressed air from said tank to said source, a closed cooling system extending from within said chamber externally of the same and about said beverage conveying means, means for circulating cooling fluid through said cooling system, a static air compressor in said chamber and operable successively by a gradually rising body of said fluid during its circulation, means for conveying compressed air from said compressor to said tank, and means for limiting the pressure in said tank to a predetermined value.

5. In a system of the class described, a source of beverage supply, means for conveying beverage from said source to a dispensing point, a compressed air storage tank, means for conveying compressed air from said tank to said source, a closed fluid circulating system, a plurality of fluid circulating devices, means for selectively including said devices in said fluid circulating system, and means operable by the circulating fluid for supplying compressed air to said tank.

6. In a system of the class described, a source of beverage supply, means for conveying beverage from said source to a dispensing point, a compressed air storage tank, means for conveying compressed air from said tank to said source, a closed cooling system through which cooling fluid may circulate to cool the beverage on its way to said dispensing point, a plurality of fluid circulating devices, means for selectively including said devices in said cooling system, means operable by the circulating fluid for supplying compressed air to said tank, means for including said last means in or omitting the same from said cooling system, and means for actuating conjointly said third and said fifth means.

7. In a system of the class described, a source of beverage supply, means for conveying beverage from said source to a dispensing point, a compressed air storage tank, means for conveying compressed air from said tank to said source, a closed cooling system through which cooling fluid may circulate to cool the beverage on its way to said dispensing point, a plurality of fluid circulating devices, means for selectively including said devices in said cooling system, means operable by the circulating fluid for supplying compressed air to said tank, means for including said last means in or omitting the same from said cooling system, and means responsive to the air pressure in said tank for actuating conjointly said third and said fifth means.

8. In a system of the class described, a source of beverage supply, means for conveying beverage from said source to a dispensing point, a compressed air storage tank, means for conveying compressed air from said tank to said source, a closed cooling system through which cooling fluid may circulate to cool the beverage on its way to said dispensing point, a plurality of fluid circulating devices, means for selectively including said devices in said cooling system, means operable by the circulating fluid for supplying compressed air to said tank, means for including said last means in said cooling system when one of said devices is included therein and for omitting said last means from said system when the other of said devices is included therein, and means responsive to the air pressure in said tank for actuating conjointly said third and said fifth means.

9. In a system of the class described, a source of beverage supply, means for conveying beverage from said source to a dispensing point, a fluid circulating cooling system for cooling the beverage on its way to said dispensing point, and means for supplying compressed air to said source, comprising an air compressor operable by the circulating fluid.

THOMAS PEAK.